(12) United States Patent
Candries

(10) Patent No.: US 12,392,337 B2
(45) Date of Patent: Aug. 19, 2025

(54) METHOD TO OPERATE A VACUUM SYSTEM

(71) Applicant: Atlas Copco Airpower N.V., Antwerp (BE)

(72) Inventor: Simon Candries, Antwerp (BE)

(73) Assignee: Atlas Copco Airpower N.V., Antwerp (BE)

( * ) Notice: Subject to any disclaimer, the term of this patent is extended or adjusted under 35 U.S.C. 154(b) by 140 days.

(21) Appl. No.: 17/904,837

(22) PCT Filed: Feb. 22, 2021

(86) PCT No.: PCT/EP2021/054319
§ 371 (c)(1),
(2) Date: Aug. 23, 2022

(87) PCT Pub. No.: WO2021/170534
PCT Pub. Date: Sep. 2, 2021

(65) Prior Publication Data
US 2023/0107879 A1    Apr. 6, 2023

(30) Foreign Application Priority Data
Feb. 24, 2020    (BE) .................................. 2020/5119

(51) Int. Cl.
*F04B 23/04*    (2006.01)
*F04B 49/20*    (2006.01)
(Continued)

(52) U.S. Cl.
CPC .............. *F04B 49/20* (2013.01); *F04C 28/02* (2013.01); *F04C 28/08* (2013.01); *F04D 19/04* (2013.01);
(Continued)

(58) Field of Classification Search
CPC .......... F04B 49/20; F04B 37/12; F04C 28/02; F04C 28/08; F04C 14/02; F04C 25/02;
(Continued)

(56) References Cited

U.S. PATENT DOCUMENTS

| 4,699,570 A | 10/1987 | Bohn | |
|---|---|---|---|
| 2006/0222506 A1* | 10/2006 | Rival | ...................... F04B 41/06 |
| 2007/0020111 A1 | 1/2007 | Rival | |

FOREIGN PATENT DOCUMENTS

| CN | 108180144 A | 6/2018 |
|---|---|---|
| FR | 3054005 A1 | 1/2018 |

(Continued)

OTHER PUBLICATIONS

PCT Notification of Transmittal of the International Search Report and the Written Opinion of the International Searching Authority, or the Declaration, PCT International Search Report and PCT Written Opinion dated Apr. 29, 2021 for corresponding PCT application Serial No. PCT/EP2021/054319, 15 pages.

(Continued)

*Primary Examiner* — Charles G Freay
(74) *Attorney, Agent, or Firm* — Theodore M. Magee; Westman, Champlin & Koehler, P.A.

(57) ABSTRACT

Method to operate a vacuum system includes at least a first vacuum pump and a second vacuum pump wherein the first vacuum pump and the second vacuum pump are connectable to a vacuum chamber to maintain a set pressure inside the vacuum chamber. The first vacuum pump is a Variable Speed Drive pump wherein the first vacuum pump and the second vacuum pump are connected in series. The method includes the steps of controlling the performance of the first vacuum pump and the performance of the first vacuum pump is (Continued)

controlled to be equal to or higher than the performance of the second vacuum pump while maintaining the set pressure in the vacuum chamber.

8 Claims, 1 Drawing Sheet

(51) Int. Cl.
    *F04C 28/02*     (2006.01)
    *F04C 28/08*     (2006.01)
    *F04D 19/04*     (2006.01)
    *F04D 25/16*     (2006.01)
    *F04D 27/02*     (2006.01)
    *F04B 37/12*     (2006.01)
    *F04C 14/02*     (2006.01)
    *F04C 25/02*     (2006.01)

(52) U.S. Cl.
    CPC ........... *F04D 19/046* (2013.01); *F04D 25/16* (2013.01); *F04D 27/0261* (2013.01); *F04B 37/12* (2013.01); *F04C 14/02* (2013.01); *F04C 25/02* (2013.01)

(58) Field of Classification Search
    CPC ........ F04D 19/04; F04D 19/046; F04D 25/16; F04D 27/0261
    See application file for complete search history.

(56) References Cited

FOREIGN PATENT DOCUMENTS

| | | |
|---|---|---|
| JP | 2013076332 A | 4/2013 |
| JP | 2015102034 A | 6/2015 |
| WO | 2006051260 A1 | 5/2006 |
| WO | 2017143410 A1 | 8/2017 |

OTHER PUBLICATIONS

British Examination Report dated Dec. 9, 2020 and Search Report dated Dec. 8, 2020 for corresponding British application Serial No. GB2009622.8, 4 pages.

Japanese Notification of Reason for Rejected dated Dec. 12, 2024 for corresponding Japanese application Serial No. 2022-550962, 9 pages.

\* cited by examiner

METHOD TO OPERATE A VACUUM SYSTEM

CROSS-REFERENCE TO RELATED APPLICATION

This application is a Section 371 National Stage Application of International Application No. PCT/EP2021/054319, filed Feb. 22, 2021, and published as WO 2021/170534 A1 on Sep. 2, 2021, the content of which is hereby incorporated by reference in its entirety and which claims priority of Belgian Application No. BE2020/5119, filed Feb. 22, 2020.

BACKGROUND

Vacuum technology is widely spread in different technologies and made available for numerous applications. Usually in those applications a vacuum system is connected to a vacuum chamber to be evacuated. Therein it is usually necessary that by the vacuum system the pressure in the vacuum chamber is below a given setpoint.

The discussion above is merely provided for general background information and is not intended to be used as an aid in determining the scope of the claimed subject matter. The claimed subject matter is not limited to implementations that solve any or all disadvantages noted in the background.

SUMMARY

The vacuum system usually comprises a vacuum pump. However, it is well known that the vacuum system comprises two vacuum pumps wherein a first vacuum pump is configured to achieve a low pressure or high vacuum. The first vacuum pump works together with a second vacuum pump or backing pump. The backing pump is configured to provide a high mass flow and being able to achieve a coarse vacuum. Upon evacuation of the vacuum chamber usually first the backing pump is evacuating the vacuum chamber up to a certain vacuum, i.e. down to a certain pressure. Then the first vacuum pump starts to generate the necessary low pressure equal to or below the given setpoint. Usually both vacuum pumps are operated constantly at maximum speed providing their highest possible volumetric flow. Thus, on the one hand fast evacuation of the vacuum chamber is guaranteed due to the provided pump performance while the pressure within the vacuum chamber can be maintained below the setpoint. However, due to this configuration a high power consumption of the vacuum system occurs.

Further, Variable Speed Drive pumps (VSD) are known that relate to vacuum pumps with adjustable rotational speed in order to control the performance of the vacuum pump. Therein the performance of the VSD can be controlled between a maximum performance and a minimum performance.

It is an object of the present invention to provide a vacuum system and a method for operating such a vacuum system that can be operated in an energy efficient manner to maintain a vacuum in a vacuum chamber.

The solution of the present problem is provided by a method to operate a vacuum system according to an embodiment.

According to the present invention the vacuum system comprises at least a first vacuum pump and a second vacuum pump wherein the first vacuum pump and the second vacuum pump are connectable to the vacuum chamber to maintain a set pressure. Therein the first vacuum pump is a Variable Speed Drive pump (VSD). Therein, the first vacuum pump and the second vacuum pump are connected in series. Therein an inlet of the first vacuum pump is connectable to the vacuum chamber wherein the outlet of the first vacuum pump is connected to the inlet of the second vacuum pump. The outlet of the second vacuum pump might be connected to the atmosphere or to a further backing pump. The maximum pump rate (also referred to as the maximum volumetric flow rate) of the first vacuum pump is 1.25 times to 4 times larger than the maximum pump rate (also referred to as the maximum volumetric flow rate) of the second vacuum pump.

The method in accordance to the present invention to operate a vacuum system preferably as described above comprises the steps of controlling the performance of the first vacuum pump wherein the performance of the first vacuum pump is controlled to be equal to or higher than the performance of the second vacuum pump while maintaining the set pressure in the vacuum chamber. Therein the first vacuum pump is defined as the vacuum pump directly connected to the vacuum chamber. Further, performance can be defined as ratio between the actual mass flow through the respective vacuum pump to the maximum mass flow through the respective vacuum pump. Alternatively, the performance can be defined as the volumetric flow of the vacuum pump or the relative volumetric flow, i.e. the ratio between the actual volumetric flow and the maximum volumetric flow of the respective vacuum pump. Alternatively, the performance can be defined as the ratio between the actual rotational speed of the respective vacuum pump to the maximum rotational speed of the respective vacuum pump.

It has been noted that the power consumption of a vacuum pump is related to the rotational speed and inlet pressure. Thus, power consumption of a vacuum pump can be decreased, for a set inlet pressure, by reducing the rotational speed of the vacuum pump. Further, it has been noted by the present invention that the backing pump, i.e. the second vacuum pump, is usually the largest energy consumer in such a vacuum system. This is since the second vacuum pump is usually configured to be able to fast evacuate the vacuum chamber resulting in a high mass flow though the second vacuum pump. However, by the present invention the first vacuum pump is controlled to operate at a higher performance than the second vacuum pump while the pressure in the vacuum chamber is maintained equal to or below the set pressure due to the combined action of the first vacuum pump and second vacuum pump. Thus, the inlet pressure of the second vacuum pump is increased while decreasing the rotational speed of the second vacuum pump resulting in a reduced power consumption of the second vacuum pump. In accordance to the present invention under the presumption of maintaining the set pressure, the inlet pressure of the second vacuum pump is maximized while the rotational speed of the second vacuum pump is minimized to achieve the effect of the present invention to minimize power consumption without overloading either one of the vacuum pumps.

In particular, the first vacuum pump is a roots pump, a molecular drag pump or a turbomolecular pump.

In particular, the second vacuum pump is a screw pump, scroll pump, rotary vane pump, claw pump or the like.

In particular, the second vacuum pump is a VSD wherein the performance of the second vacuum pump is controlled to be reduce while maintaining the set pressure. Thus, if the first vacuum pump is controlled to increase the performance usually this will result in a reduction of pressure inside the pressure chamber. However, to further reduce the energy consumption of the vacuum system the second vacuum pump can be controlled to reduce its performance while maintaining the set pressure and compensating for the increase of performance of the first vacuum pump.

In particular, the first vacuum pump and/or the second vacuum pump comprises more than one vacuum pump preferably connected in parallel. Thus, the first vacuum pump and/or the second vacuum pump is built as one or more vacuum pumps acting together. Each vacuum pump connected in parallel comprise a common inlet and a common outlet. Therein, at least one of the vacuum pumps of the first vacuum pump or at least one of the vacuum pumps of the second vacuum pump is built as a VSD. Thus, for example if the first vacuum pump comprises two vacuum pumps then one of these two vacuum pumps can be operated always at maximum performance while the other vacuum pump of the first vacuum pump can be operated in accordance to the above described method. The same applies also to the second vacuum pump. Of course, it is possible to control all vacuum pumps of the first vacuum pump and/or all vacuum pumps of the second vacuum pump in the same manner.

In particular, the performance of the first vacuum pump is maximized and the performance of the second vacuum pump is minimized while maintaining the set pressure. If the vacuum chamber is evacuated and the vacuum system is in the operational state of maintaining the set pressure of the vacuum chamber, the first vacuum pump is operated at maximum performance while the second vacuum pump is operated at minimum performance. Thus, the power consumption of the second vacuum pump can be greatly reduced reducing the overall energy consumption of the vacuum system.

In particular, if the pressure in the vacuum chamber is above the set pressure the first vacuum pump is operated at maximum performance and preferably the second vacuum pump is operated in dependence on the pressure. Thus, the second vacuum pump is operated to meet the requirements of the application in order to achieve sufficiently fast the desired vacuum below the set pressure in the vacuum chamber.

In particular, if the pressure in the vacuum chamber is equal to or below the set pressure, the second vacuum pump is operated at minimum performance. Thus, the energy consumption of the vacuum system can be minimized. Preferably, the vacuum pump is then operated in dependence on the pressure inside the vacuum chamber. Thus, if the pressure in the vacuum chamber is equal to or below the set pressure the first vacuum pump is operated in dependence on the pressure in the vacuum chamber to meet the applications requirements and maintain the desired pressure in the vacuum chamber.

In particular, the maximum pump rate of the first vacuum pump is two times to four times larger than the maximum pump rate of the second vacuum pump. Thus, the maximum pump rate of the first vacuum pump is larger than the maximum pump rate of the second vacuum pump providing sufficient fast evacuation times of the vacuum chamber.

Alternatively, the maximum pump rate of the first vacuum pump is 1.25 times to 1.5 times larger than the maximum pump rate of the second vacuum pump. Thus, by the first vacuum pump having a maximum pump rate comparable to or slightly above the maximum pump rate of the second vacuum pump, an operation state can be easily maintained in which the performance of the first vacuum pump is selected to be higher than the performance of the second vacuum pump. Thus, a situation can be achieved in which the first vacuum pump is always running thereby reducing the power consumption of the second vacuum pump and also reducing the power consumption of the overall vacuum system.

In particular, the performance of the first vacuum pump and/or second vacuum pump is increased at least above a threshold if the first vacuum pump and/or the second vacuum pump is running at a speed below the threshold for a predetermined time. If the first vacuum pump or second vacuum pump is running at a speed below the threshold the lubrication of the bearings of the first vacuum pump or second vacuum pump might become insufficient. Thus, increased wear or damaged to the bearings of the first vacuum pump or second vacuum pump might occur. In order to avoid this situation, the speed, i.e. performance, of the first vacuum pump or the second vacuum pump, respectively, is increased above the threshold in order to ensure sufficient lubrication of the bearings of the respective vacuum pump.

Further, the present invention relates to a vacuum system as previously described. In particular the first vacuum pump and preferably also the second vacuum pump are connected to a control unit wherein the control unit is adapted to carry out the method as described above.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following the present embodiments of the present invention will be described together with the accompanied drawings.

The figures show.

DETAILED DESCRIPTION

Figure 1:
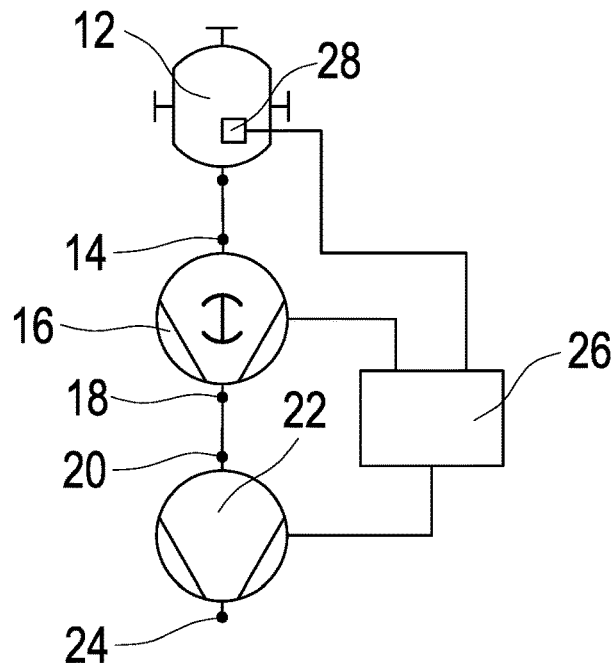
FIG. 1 a schematic drawing of the vacuum system according to the present invention and FIG. 2 a flow diagram for the method according to the present invention.

The vacuum system according to the present invention comprises a vacuum chamber 12 to be evacuated and maintained at a set pressure. The vacuum chamber 12 is connected with an inlet 14 of the first vacuum pump 16. The outlet 18 of the first vacuum chamber 16 is connected to an inlet 20 of a second vacuum pump 22. Hence, the outlet pressure of the first vacuum pump 16 is equal to the inlet pressure of the second vacuum pump 22. The outlet 24 of the second vacuum pump 22 is connected to atmosphere or another backing pump. The first vacuum pump 16 can be built as one or more vacuum pumps connected in series or in parallel acting together. Also, the second vacuum pump 22 can be built by one or more vacuum pumps connected in series or parallel and acting together. The first vacuum pump 16 is connected to a control unit 26. Further, the second vacuum pump 22 is also connected to the control unit 26. In the present embodiment, the control unit 26 in connected to a pressure gauge 28 inside the vacuum chamber 12. By the control unit 26 the performance, i.e. volumetric flow, of the first vacuum pump 16 and/or second vacuum pump 22 can be controlled. Therein the first vacuum pump 16 is controlled to run always at the highest possible performance under which the pressure inside the vacuum chamber 12 is maintained. If the pressure inside the vacuum chamber 12 is below the set pressure, then the performance of the second vacuum pump is reduced. In particular, the first vacuum pump 16 is controlled to run always at a higher performance than the second vacuum pump 22. Thus, by the high performance of the first vacuum pump 16 the pressure at the inlet 20 of the second vacuum pump 22 is increased reducing the energy consumption of the second vacuum pump 22. Further, due to the increased inlet pressure of the second vacuum pump 22, rotational speed of the second vacuum pump 22 can be reduced without loss of vacuum in the vacuum chamber. Thus, the first vacuum pump 16 is controlled to maximize the inlet pressure of the second vacuum pump 22 by an increased performance, i.e. volumetric flow. Further, the second vacuum pump 22 is controlled to be operated at minimum rotational speed to achieve a minimized energy consumption while maintaining the set pressure in the vacuum chamber. However, the maximum inlet pressure is limited by the first vacuum pump 16. Exceeding the allowable pressure difference between the inlet and outlet of the first vacuum pump 16 would overload the first vacuum pump 16. Therefore, it is preferred to implement a first vacuum pump 16 with a maximum pump rate greater than the maximum pump rate of the second vacuum pump.

Figure 2:
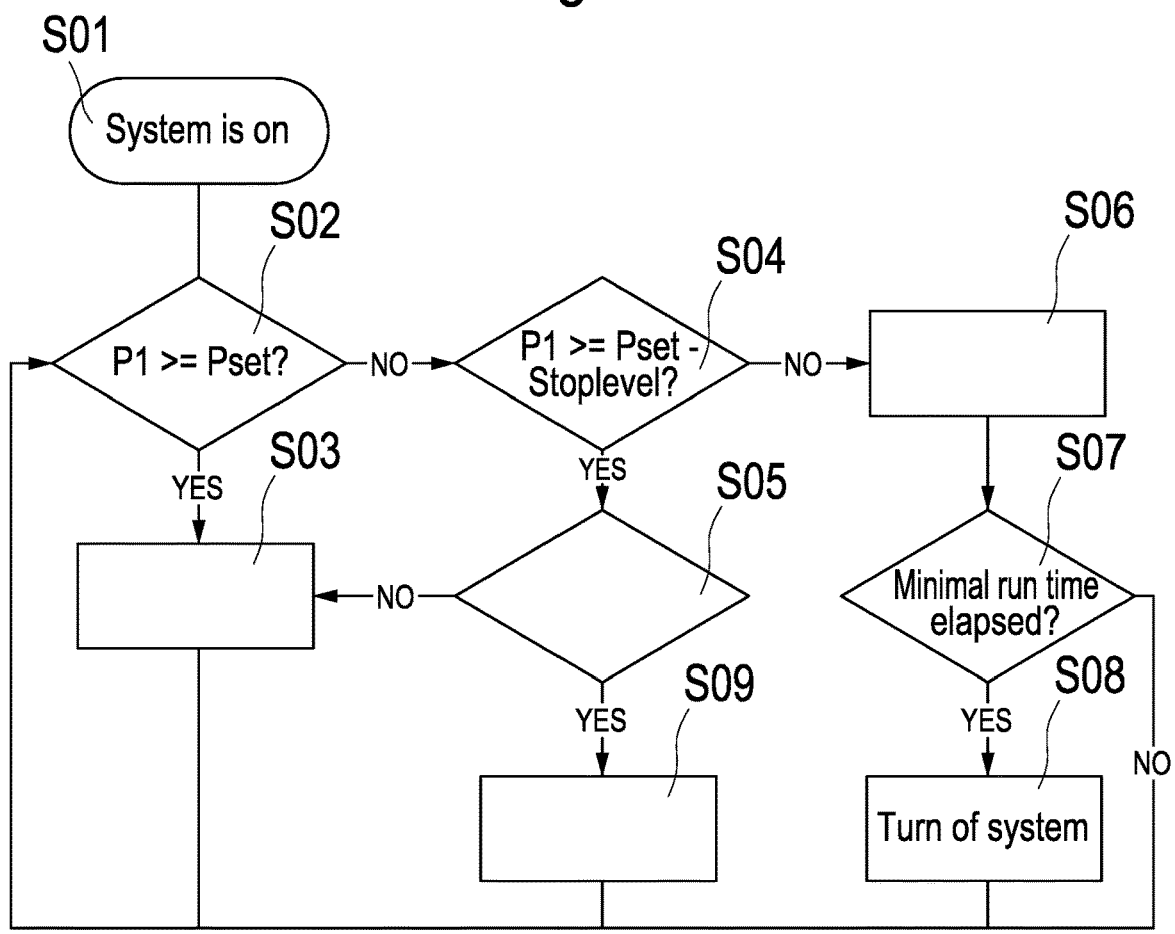

FIG. 2 shows a flow diagram of the vacuum system of FIG. 1.

In step S01 is system is turned on. Then, in step S02 it is checked whether the pressure P1 inside the vacuum chamber 12 is larger or equal than the set pressure Pset. If the pressure P1 inside the vacuum chamber 12 is larger or equal than the set pressure Pset, then in step S03 the first vacuum pump 16 is controlled to operate at the maximum performance. This maximum is depending on inlet and outlet pressure, thus also depending on the speed of the second pump. The second vacuum pump 22 is controlled to operate in dependence on the pressure P1 inside the vacuum chamber 12.

If the pressure inside the vacuum chamber 12 is below the set pressure, then in step S04 it is checked whether a stop level has been reached, i.e. P1 is equal to or larger than Pset minus Stoplevel. If the pressure inside the vacuum chamber 12 is below the stop level, then in step S06 the first vacuum pump 16 and the second vacuum pump 22 are both operated at their minimum performance.

If the pressure inside the vacuum chamber 12 is below the set pressure Pset but above the stop level, then in step S05 it is checked whether the second vacuum pump 22 is operated at minimum performance. If the second vacuum pump 22 is not operated at minimum performance, then it is returned to step S03 wherein the first vacuum pump 16 is controlled to operate at the maximum performance while the second vacuum pump 22 is controlled to operate in dependence on the pressure P1 inside the vacuum chamber 12. If the second vacuum pump 22 is operated at minimum performance, then in step S09 first vacuum pump 16 is controlled to operate in dependence on the pressure P1 inside the vacuum chamber 12 while the second vacuum pump 22 is controlled to operate at the minimum performance.

If both vacuum pumps are operated at their minimum performance, then in step S07 it is checked whether the first vacuum pump 16 or the second vacuum pump 22 is operated at minimum performance for a predetermined time. If the predetermined time has been reached, then in step S08 the vacuum system is tuned off.

The above described method is repeatedly applied in dependence on a change of the pressure inside the vacuum chamber 12.

Hence, through the method according to the present invention the first vacuum pump is usually operated at a higher performance than the second vacuum pump. Due to this configuration the inlet pressure of the second vacuum pump is maximized. Thus, the required power consumption of the second vacuum pump is reduced, thereby reducing the overall power consumption of the vacuum system.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method to operate a vacuum system comprising at least a first vacuum pump and a second vacuum pump, wherein the first vacuum pump and the second vacuum pump are connectable to a vacuum chamber, wherein the first vacuum pump is a variable speed drive pump (VSD pump), wherein the first vacuum pump and the second vacuum pump are connected in series and a maximum pump rate of the first vacuum pump is 1.25 times to 4 times larger than a maximum pump rate of the second vacuum pump, the method comprising steps of:
   controlling a performance of the first vacuum pump after a pressure in the chamber has reached a set pressure value, wherein the performance of the first vacuum pump is controlled to be equal to or higher than a performance of the second vacuum pump while maintaining the pressure in the vacuum chamber at or below the set pressure value;
   characterized in that the performance of first vacuum pump is increased at least above a threshold if the first vacuum pump is running at a performance below the threshold for a predetermined time and/or the performance of the second vacuum pump is increased at least above the threshold if the second vacuum pump is running at a performance below the threshold for the predetermined time;
   further characterized in that if the pressure in the vacuum chamber is above the set pressure value, the first vacuum pump is operated at maximum performance and the second vacuum pump is operated in dependence on the pressure.

2. The method according to claim 1, characterized in that the second vacuum pump is a VSD pump, wherein the performance of the second vacuum pump is controlled to be reduced while maintaining the pressure in the vacuum chamber at or below the set pressure value.

3. The method according to claim 1, characterized in that the first vacuum pump and/or the second vacuum pump comprise more than one vacuum pump connected in parallel.

4. The method according to claim 1, characterized in that the performance of the first vacuum pump is at a maximum value and the performance of the second vacuum pump is at a minimum while maintaining the pressure in the vacuum chamber at or below the set pressure value.

5. The method according to claim 1, characterized in that the maximum pump rate of the first vacuum pump is 2 times to 4 times larger than the maximum pump rate of the second vacuum pump.

6. The method according to claim 1, characterized in that the maximum pump rate of the first vacuum pump is 1.25 times to 1.5 times larger than the maximum pump rate of the second vacuum pump.

7. A vacuum system comprising a first vacuum pump and a second vacuum pump connectable with a vacuum chamber, wherein the first vacuum pump and the second vacuum pump are connected to a control unit, wherein the control unit is adapted to carry out the method of claim 1.

8. A method to operate a vacuum system comprising at least a first vacuum pump and a second vacuum pump, wherein the first vacuum pump and the second vacuum pump are connectable to a vacuum chamber, wherein the first vacuum pump is a variable speed drive pump (VSD pump), wherein the first vacuum pump and the second vacuum pump are connected in series and a maximum pump rate of the first vacuum pump is 1.25 times to 4 times larger than a maximum pump rate of the second vacuum pump, the method comprising steps of:

controlling a performance of the first vacuum pump after a pressure in the chamber has reached a set pressure value, wherein the performance of the first vacuum pump is controlled to be equal to or higher than a performance of the second vacuum pump while maintaining the pressure in the vacuum chamber at or below the set pressure value;

characterized in that the performance of first vacuum pump is increased at least above a threshold if the first vacuum pump is running at a performance below the threshold for a predetermined time and/or the performance of the second vacuum pump is increased at least above the threshold if the second vacuum pump is running at a performance below the threshold for the predetermined time;

further characterized in that if the pressure in the vacuum chamber is equal to or below the set pressure value, the second vacuum pump is operated at minimum performance and the first vacuum pump is operated in dependence on the pressure.

* * * * *